(12) United States Patent
Song et al.

(10) Patent No.: US 9,065,558 B2
(45) Date of Patent: Jun. 23, 2015

(54) APPARATUS AND METHOD FOR TRANSMITTING/RECEIVING DATA IN HUMAN BODY COMMUNICATION SYSTEM

(75) Inventors: Seong-Jun Song, Seoul (KR); Chul-Jin Kim, Yongin-si (KR); Jong-Rim Lee, Seoul (KR); Chang-Ryong Heo, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1545 days.

(21) Appl. No.: 12/589,353

(22) Filed: Oct. 22, 2009

(65) Prior Publication Data

US 2010/0103918 A1   Apr. 29, 2010

(30) Foreign Application Priority Data

Oct. 23, 2008  (KR) ........................ 10-2008-0104181

(51) Int. Cl.
*H04J 1/00* (2006.01)
*H04B 7/208* (2006.01)
*H04J 3/00* (2006.01)
*H04B 13/00* (2006.01)

(52) U.S. Cl.
CPC .................................. *H04B 13/005* (2013.01)

(58) Field of Classification Search
CPC ....................................................... H04L 5/023
USPC .......... 370/343, 344, 345; 455/345, 263, 326, 455/336, 442, 498
See application file for complete search history.

(56) References Cited

U.S. PATENT DOCUMENTS

| | | | |
|---|---|---|---|
| 2006/0052056 A1* | 3/2006 | Park et al. | 455/41.1 |
| 2008/0158432 A1* | 7/2008 | Hwang et al. | 348/725 |
| 2010/0172394 A1 | 7/2010 | Lim et al. | |
| 2010/0246643 A1* | 9/2010 | Lim et al. | 375/147 |
| 2010/0272156 A1* | 10/2010 | Park et al. | 375/142 |
| 2011/0250837 A1* | 10/2011 | Hwang et al. | 455/39 |
| 2012/0128036 A1* | 5/2012 | Kang et al. | 375/144 |

FOREIGN PATENT DOCUMENTS

| | | |
|---|---|---|
| KR | 10-2006-0064472 | 6/2006 |
| KR | 10-0727817 | 6/2007 |
| KR | 10-0859724 B1 | 9/2008 |

OTHER PUBLICATIONS

Notice of Preliminary Rejection dated Jul. 24, 2014 in connection with Korean Patent application No. 10-2008-0104181, 8 pages.

* cited by examiner

*Primary Examiner* — Brandon Renner
*Assistant Examiner* — Abdelnabi Musa

(57) ABSTRACT

An apparatus and a method for reducing wireless data transmission in a personal area network is configured to generate and transmit a packet including information discriminating between a synchronous channel and a data channel. The apparatus and method discriminate between the synchronous channel and data channel when receiving a packet in order to improve data transmission performance of a human body communication system. The apparatus and the method use a transmission channel whose frequency is lower than an antenna frequency as a synchronous channel, and use a transmission channel whose frequency is higher than the antenna frequency as a data channel.

17 Claims, 6 Drawing Sheets

APPARATUS AND METHOD FOR TRANSMITTING/RECEIVING DATA IN HUMAN BODY COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Oct. 23, 2008 and assigned Serial No. 10-2008-0104181, the entire disclosure of which is hereby incorporated by reference.

TECHNICAL FIELD OF THE INVENTION

The present invention relates to an apparatus and a method for transmitting data only during a close contact state or a contact state in a human body communication system. More Particularly, the present invention relates to an apparatus and a method for reducing wireless data transmission by generating and transmitting a packet including information discriminating between a synchronous channel and a data channel, and discriminating between the synchronous channel and data channel when receiving a packet in order to improve data transmission performance of a human body communication system.

BACKGROUND OF THE INVENTION

As a modern society recently enters a ubiquitous age allowing information exchange anywhere and anytime, a Personal Area Network (PAN) via which an individual collects various data from neighboring mobile terminals and processes them has emerged. Under this circumstance, the number of personal area terminals directly carried by individuals or found in the neighborhood, that is, the number of mobile terminals, also gradually increases. Accordingly, information exchange between the mobile terminals becomes active.

To exchange data between the mobile terminals, a communication method for connecting the mobile terminals with each other is required. As a traditional connection method, a communication method using a wired line exists, but this method has a disadvantage of entangled lines and causing much inconvenience when a user carries a cable. Therefore, for access between personal area terminals, (that is, mobile terminals) various wireless communication schemes such as Bluetooth, IrDA, ZigBee, Ultra Mobile Broadband (UMB), and the like, have been commercialized or are under development.

Recently, a technique for transmitting/receiving data using a human body as a medium of electrical signal transfer has been suggested. An apparatus for transmitting/receiving an electrical signal using a human body as a medium is applied in various fields including medical diagnosis equipment. An apparatus for transmitting data using a human body as a medium of electrical signal transfer, or receiving and processing data transmitted by the medium of a human body includes an electrode for directly contacting a human body or contacting a human body with a coating interposed, and a human body communication module for transmitting/receiving an electrical signal by the medium of a human body via this electrode. Since the apparatus for transmitting/receiving an electrical signal by the medium of a human body can transfer an electrical signal by only bringing a human body into contact with a specific device, the apparatus can transmit data required between a user and a system even without a separate wired line or wireless communication equipment. User convenience in data transmission can be improved even without establishing separate wired/wireless communication equipment or a separate communication line by applying such a human body communication apparatus to various fields.

To reduce power consumption during a stand-by state before contact with a human body, the above-described human body communication apparatus inserts a human body contact detector to minimize power consumption of a micro controller and a transmission/reception circuit until the contact is made.

However, in the case where only the contact detector is provided, a problem that, due to a human body antenna effect, a communication process is performed by only detection of a human body contact, even under a circumstance where wireless communication via air is possible but communication using a human body cannot be performed occurs. For example, even in the case where only one of a transmitter and a receiver is brought into contact, or even in the case where a human body communication apparatus exists in a pocket, or even in the case where a contact is not made between users who own or carry human body communication apparatuses in pockets, contact detection is made but wireless communication is performed instead of human body communication.

More particularly, even in the case where a high frequency band is used to achieve high speed transmission, a human body antenna effect becomes serious and such a problem becomes serious even more.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and a method for improving data transmission performance of a human body communication system.

Another aspect of the present invention is to provide an apparatus and a method for reducing wireless data transmission in a human body communication system.

Yet another aspect of the present invention is to provide an apparatus and a method for generating a packet including information discriminating between a synchronous channel and a data channel in a human body communication system.

Still yet another aspect of the present invention is to provide an apparatus and a method for discriminating between a synchronous channel and a data channel by receiving packet data in a human body communication system.

In accordance with an aspect of the present invention, an apparatus for transmitting/receiving data in a human body communication system is provided. The apparatus uses a transmission channel whose frequency is lower than an antenna frequency as a synchronous channel, and uses a transmission channel whose frequency is higher than the antenna frequency as a data channel.

In accordance with another aspect of the present invention, a method for transmitting/receiving data in a human body communication system is provided. The method includes using a transmission channel whose frequency is lower than an antenna frequency as a synchronous channel, and using a transmission channel whose frequency is higher than the antenna frequency as a data channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged human body communication system.

Exemplary embodiments of the present invention provide an apparatus and a method for reducing wireless data transmission in order to improve data transmission performance of a human body communication system.

Figure 1:
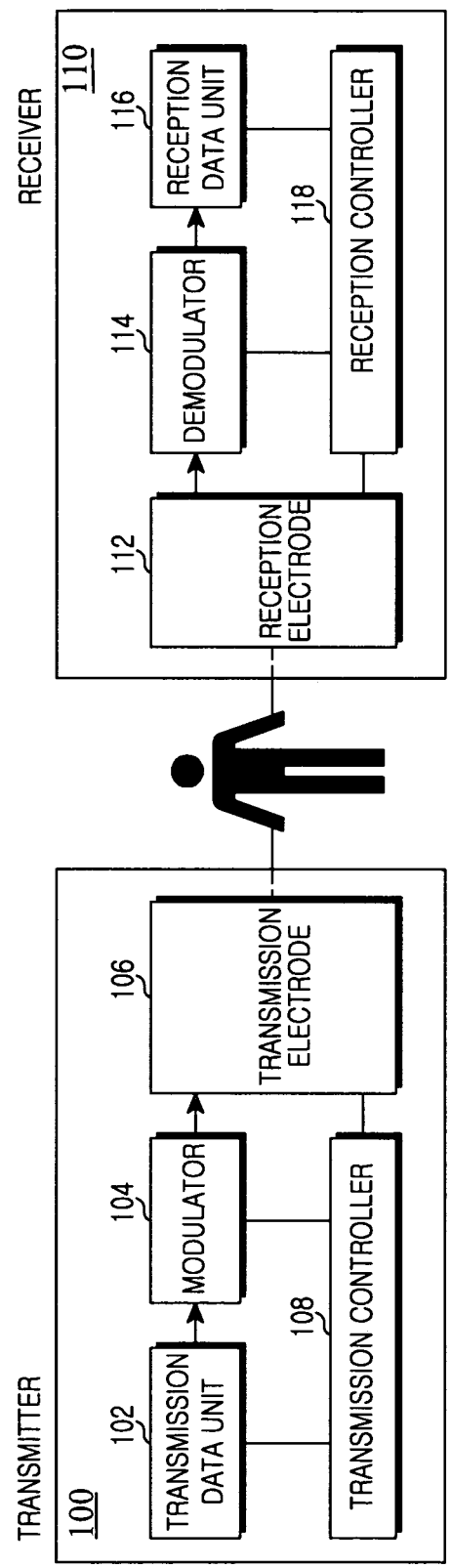
FIG. 1 illustrates a block diagram of a human body communication system according to an exemplary embodiment of the present invention.

FIG. 1 illustrates a block diagram of a human body communication system according to an exemplary embodiment of the present invention.

Referring to FIG. 1, the human body communication system includes a transmitter 100 and a receiver 110.

The transmitter 100 includes a transmission data unit 102, a modulator 104, a transmission electrode 106, and a transmission controller 108. The receiver 110 includes a reception electrode 112, a demodulator 114, a reception data unit 116, and a reception controller 118.

The transmission data unit 102 of the transmitter 100 generates data to be transmitted, and transfers the generated data to the modulator 104. The modulator 104 modulates the data so that the data is suitable for a frequency, and transfers the modulated data to the transmission electrode 106. The transmission electrode 106 is coupled to a human body, which is a medium, and transmits the modulated data to the human body. The transmission controller 108 controls the transmitter 100 to transmit data; generates a preamble including synchronous channel information and a preamble including data channel information; and generates a packet including the generated preambles.

The transmission controller 108 divides a transmission channel into a synchronous channel and a data channel. That is, the transmission controller 108 performs synchronization using a low frequency band through human body communication to transmit data by using a transmission channel whose frequency is lower than an antenna frequency as a synchronous channel, and using a transmission channel whose frequency is higher than the antenna frequency as a data channel.

The reception electrode 112 of the receiver 110 is coupled to the human body, receives the modulated data. The reception electrode 112 transfers the modulated data to the demodulator 114. The demodulator 114 restores the original data by demodulating the modulated data, and transfers the restored data to the reception data unit 116. The reception data unit 116 stores the restored data or performs a necessary operation. The reception controller 118 measures intensity of a reception signal and compares the measured intensity of the reception signal with a predetermined threshold. Thereafter, when determining the measured reception signal intensity is greater than the reception signal threshold of the data channel, the reception controller 118 can select a channel depending on reception signal intensities of carriers of the synchronous channel and the data channel by processing to select a data channel frequency from a synchronous channel frequency, and can convert a reception signal into a digital signal.

In other words, when contacting a human body, the receiver 110 receives a transmission signal to perform a demodulation process for a carrier of the synchronous channel.

Here, an initial oscillation frequency of the carrier of the synchronous channel is obtained by dividing a carrier frequency of the data channel by an integer ($f_{DC}=N \cdot f_{SC}$).

Since carriers of the synchronous channel and the data channel are synchronized with each other by the above relation, when performing a synchronization process in the synchronization channel, the receiver performs only a symbol synchronization process in a regular preamble including data channel information without performing an additional carrier synchronization process in the data channel.

That is, a carrier frequency of the data channel is made integer-multiple of a carrier frequency of the synchronous channel, so that whether data is synchronized may be determined.

When determining a reception signal is greater than a reception signal threshold of the data channel, the receiver 110 can convert a reception signal to a digital signal by selecting the frequency of the data channel from the frequency of the synchronous channel.

Herein above, an apparatus for reducing wireless data transmission in order to improve data transmission performance of a human body communication system has been described. Hereinafter, a method for reducing wireless data transmission in order to improve data transmission performance of a human body communication system using the apparatus according to an exemplary embodiment of the present invention will be described.

Figure 2:
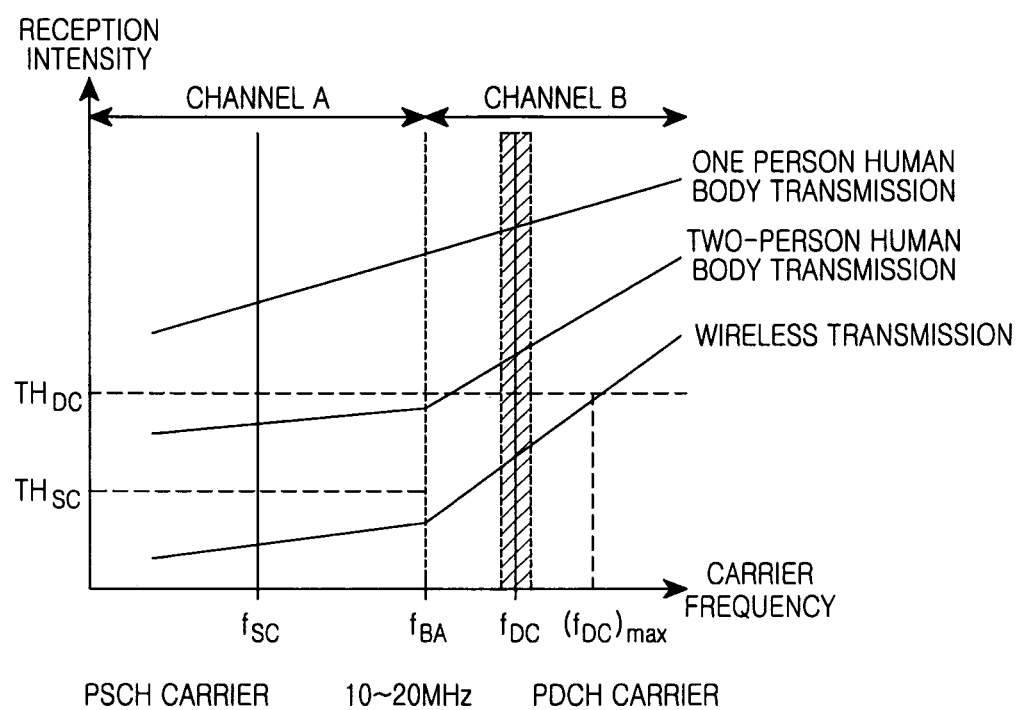
FIG. 2 illustrates a graph of an intensity of a reception signal versus a carrier frequency in a human body communication system according to an exemplary embodiment of the present invention.

FIG. 2 illustrates a graph of an intensity of a reception signal versus a carrier frequency in a human body communication system according to an exemplary embodiment of the present invention.

FIG. 2 illustrates a graph of reception intensity versus a carrier frequency with respect to human body transmission and wireless transmission. Referring to FIG. 2, in the case of human body transmission of one person or two persons, reception intensity increases as a frequency increases. More particularly, in the case of human body transmission between two persons, reception intensity increases more rapidly in the range above a human body antenna frequency $f_{BA}$.

Furthermore, even in the case of wireless transmission, reception intensity increases steeply in the range above the human body antenna frequency $f_{BA}$. This is because a human body antenna effect appears from the frequency band $f_{BA}$ (10-20 MHz) to influence human body transmission between two persons or wireless transmission.

According to an exemplary embodiment of the present invention, a transmission channel is divided into a channel A that uses a frequency lower than the human body antenna frequency $f_{BA}$ as a carrier frequency, and a channel B that uses a frequency higher than the human body antenna frequency $f_{BA}$ as a carrier frequency. When a threshold for reception intensity is set to a value between reception intensity of human body transmission and reception intensity of wireless transmission, the reception intensity of the human body transmission becomes greater than the threshold and the reception intensity of the wireless transmission becomes less than the threshold in the channel A.

Additionally, since the position of a frequency used as a threshold for discriminating between the human body transmission and the wireless transmission changes depending on the position of the threshold in the channel B, when the channel A, that can discriminate between the human body transmission and the wireless transmission, is used as a synchronization channel, and the channel B is used as a data channel to transmit a packet, high speed data transmission becomes possible only through a human body even under an environment where wireless transmission is possible.

Accordingly, the channel A is denoted by a Packet Synchronization Channel (PSCH), and the channel B is denoted by a Packet Data Channel (PDCH). A carrier frequency in the PSCH is denoted by $f_{SC}$, and a carrier frequency in the PDCH is denoted by $f_{DC}$. Here, assuming that a carrier frequency at a boundary between the wireless transmission and the human body transmission using the threshold is $(f_{DC})_{max}$, the frequency of a carrier has the following relation.

$$f_{SC} < f_{BA} < f_{DC} \leq f(_{DC})_{max} \quad [\text{Eqn. 1}]$$

Additionally, since reception intensity of the PDCH is always greater than reception intensity of the PSCH, a threshold of the data channel is equal to or greater than a threshold of the synchronous channel ($TH_{SC} \leq TH_{DC}$).

Figure 3:
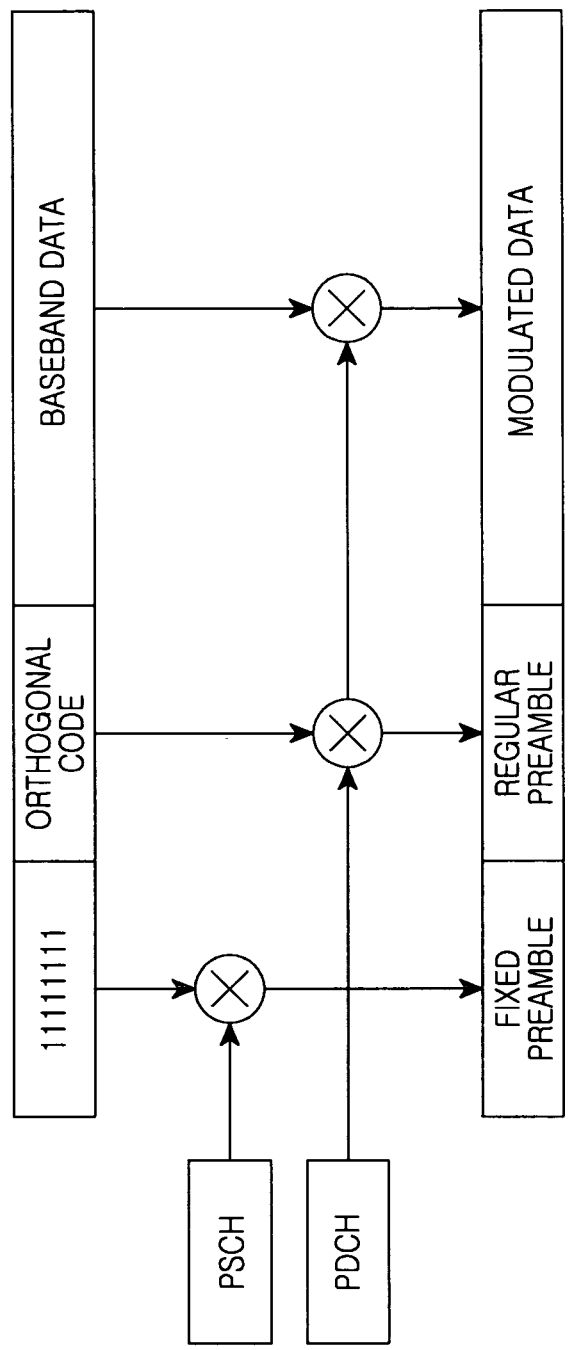
FIG. 3 illustrates a view of a packet of a human body communication system according to an exemplary embodiment of the present invention.

FIG. 3 illustrates a view of a packet of a human body communication system according to an exemplary embodiment of the present invention.

Referring to FIG. 3, unlike the conventional method of discriminating between a packet and a frame, and receiving synchronization data, a packet of the human body communication system according to an exemplary embodiment of the present invention allows a synchronous channel and a data channel to be used substantially simultaneously for each packet.

A packet of a human body communication according to an exemplary embodiment of the present invention can be divided into a preamble and data. The preamble can be divided into a 'fixed preamble' and a 'regular preamble'.

The 'fixed preamble' can be generated using a code (e.g., 11111111) including a predetermined pattern in a PSCH, and the 'regular preamble' can be generated using an orthogonal code such as a Pseudo Noise (PN) code in a PDCH. The data is modulated in the PDCH, and includes two parts of preambles and a packet.

Regarding the packet, since synchronization for a carrier is performed in a PSCH using a fixed preamble, and then data synchronization and reception become possible in a PDCH, a data reception time is not additionally lengthened and only transmission via a human body becomes possible with respect to all data.

Figure 4:
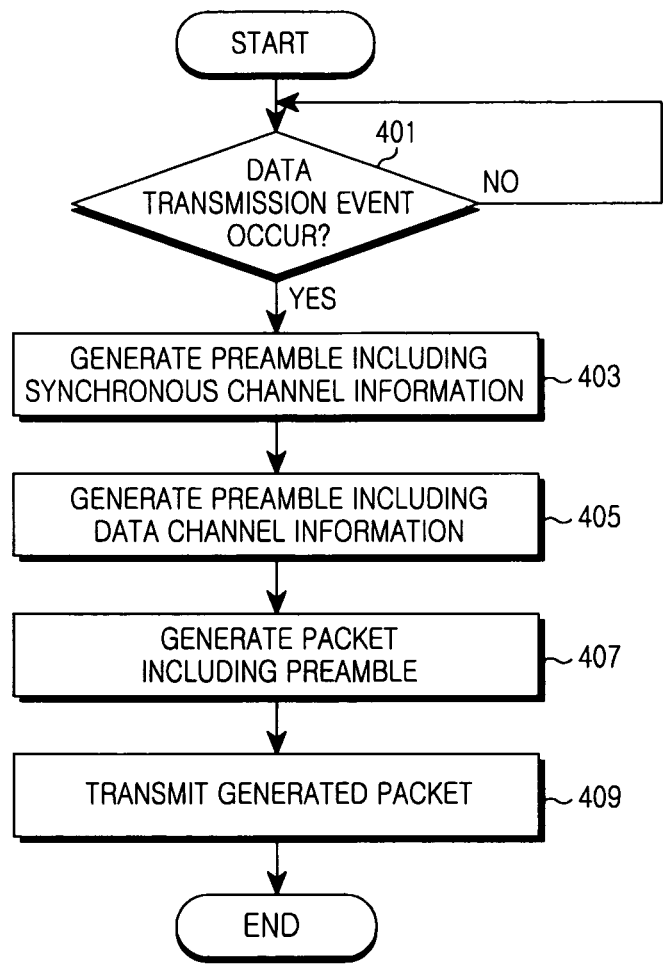
FIG. 4 illustrates a flowchart for a human body communication process of a transmitter according to an exemplary embodiment of the present invention.

FIG. 4 illustrates a flowchart for a human body communication process of a transmitter according to an exemplary embodiment of the present invention.

Referring to FIG. 4, the transmitter determines whether a data transmission event using human body communication occurs in step 401.

When the event does not occur, the transmitter repeatedly performs the process of step 401.

When determining that the event occurs, the transmitter generates a preamble including synchronous channel information in step 403, and generates a preamble including data channel information in step 405.

The preambles, including information of a synchronous channel and a data channel, can be generated to allow a mobile terminal that supports the human body communication to use a method of discriminating between the synchronous channel and the data channel, performing packet synchronization using the synchronous channel, and then transmitting data via the data channel as in a Code Division Multiple Access (CDMA) mobile communication scheme during data transmission.

Accordingly, when performing synchronization by transmitting a packet necessary for synchronization through the synchronous channel, and then transmitting data via the data channel, to prevent a problem that data is transmitted not only by a human body but also wirelessly under an environment where a time until data is received is lengthened, and discrimination between wireless transmission and human body transmission becomes difficult due to a human body antenna effect, unlike the conventional art of discriminating between a packet and a frame and performing synchronization and data reception; an exemplary embodiment of the present invention uses, as a synchronization channel, a channel that uses a frequency lower than a human body antenna frequency $f_{BA}$ as a carrier frequency, and uses, as a data channel, a channel that uses a frequency higher than the human body antenna frequency $f_{BA}$ as a carrier frequency. That is, the preambles, including information of the synchronous channel and the data channel of the transmitter, can be used as information for discriminating between the synchronous channel and the data channel at a receiver.

The transmitter generates a packet including the preambles in step 407, and transmits the generated packet in step 409.

Thereafter, the transmitter ends the present algorithm.

Figure 5:
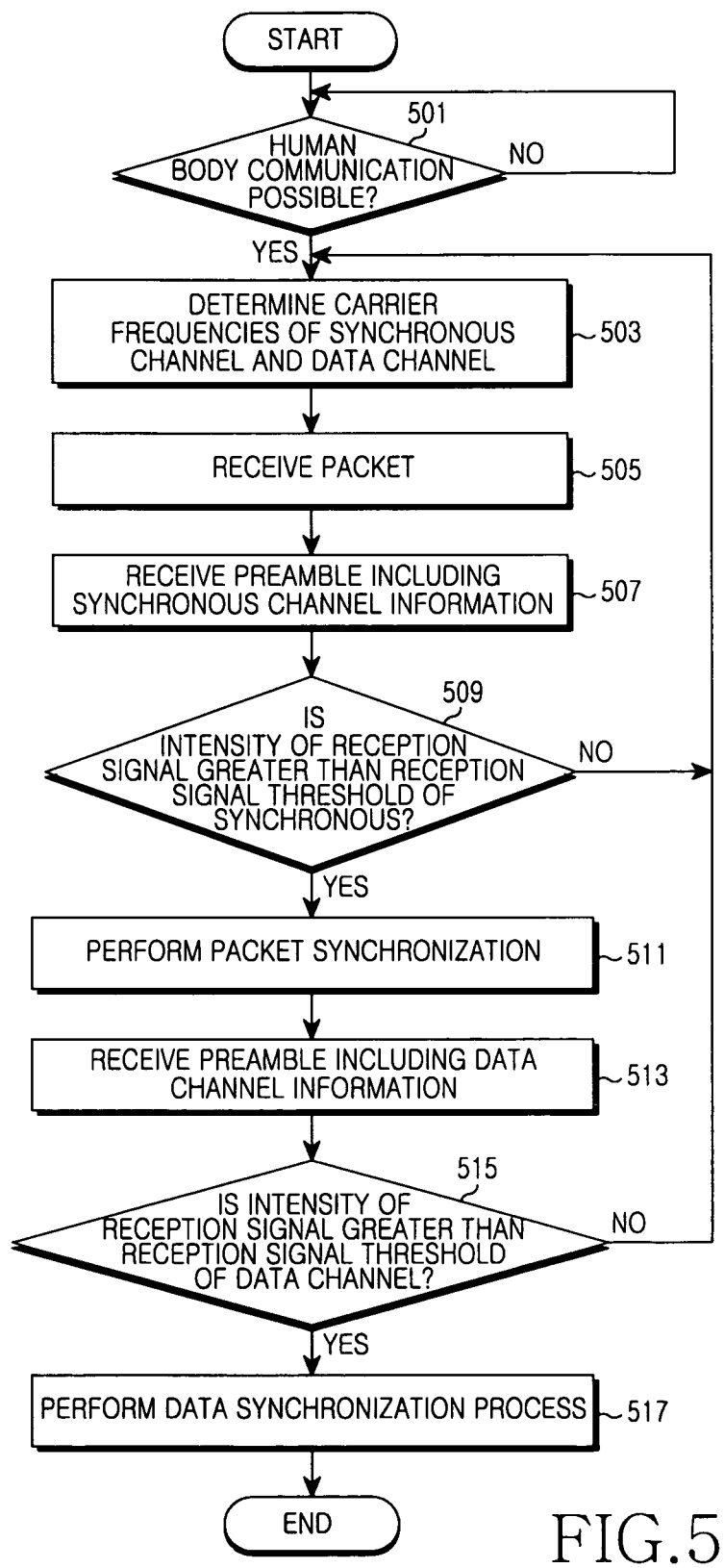
FIG. 5 illustrates a flowchart for a human body communication process of a receiver according to an exemplary embodiment of the present invention.

FIG. 5 illustrates a flowchart for a human body communication process of a receiver according to an exemplary embodiment of the present invention.

Referring to FIG. 5, the receiver determines whether human body communication can be performed in step 501.

When determining that the human body communication cannot be performed, the receiver repeatedly performs the process of step 501.

When determining that the human body communication can be performed, the receiver selects carrier frequencies of a synchronous channel and a data channel in step 503 and receives a packet in step 505.

The receiver can measure intensity of a reception signal by receiving a preamble including synchronous channel information in step 507, and determines whether the intensity of the reception signal measured in step 507 is greater than a reception signal threshold of a synchronous channel in step 509. Here, the reception signal threshold of the synchronous channel serves as a threshold of a reception signal for determining the synchronous channel. When determining that intensity of the reception signal is greater than the reception signal threshold of the synchronous channel, the receiver determines a channel is a synchronous channel and performs a synchronization process.

The receiver can perform a packet synchronization process in step 511, and selects a carrier frequency of a data channel.

The receiver can measure intensity of a reception signal by receiving a preamble including data channel information in step 513.

The receiver can compare the measured intensity of the reception signal with a reception signal threshold of the data channel in step 515. Here, the reception signal threshold of the data channel serves as a threshold of a reception signal for determining the data channel, and is set to be equal to or greater than the reception signal threshold of the synchronous channel.

When determining that the intensity of the reception signal is smaller than the reception signal threshold of the data channel, the receiver performs the process of step 503.

When determining that the intensity of the reception signal is greater than the reception signal threshold of the data channel, the receiver determines that a channel is the data channel, converts the reception signal into a digital signal, and performs a data synchronization process and a data reception process in step 517.

Thereafter, the receiver ends the present algorithm.

In other words, an exemplary embodiment of the present invention uses, as a synchronization channel, a channel that uses a frequency lower than a human body antenna frequency $f_{BA}$ as a carrier frequency, and uses, as a data channel, a channel that uses a frequency higher than the human body antenna frequency $f_{BA}$ as a carrier frequency.

Accordingly, the receiver performs a synchronization process until a reception signal intensity of a preamble including synchronous channel information is determined and a data channel is determined. After the data channel is determined using reception signal intensity of a preamble including data channel information, data synchronization and data reception process are performed.

Figure 6B:
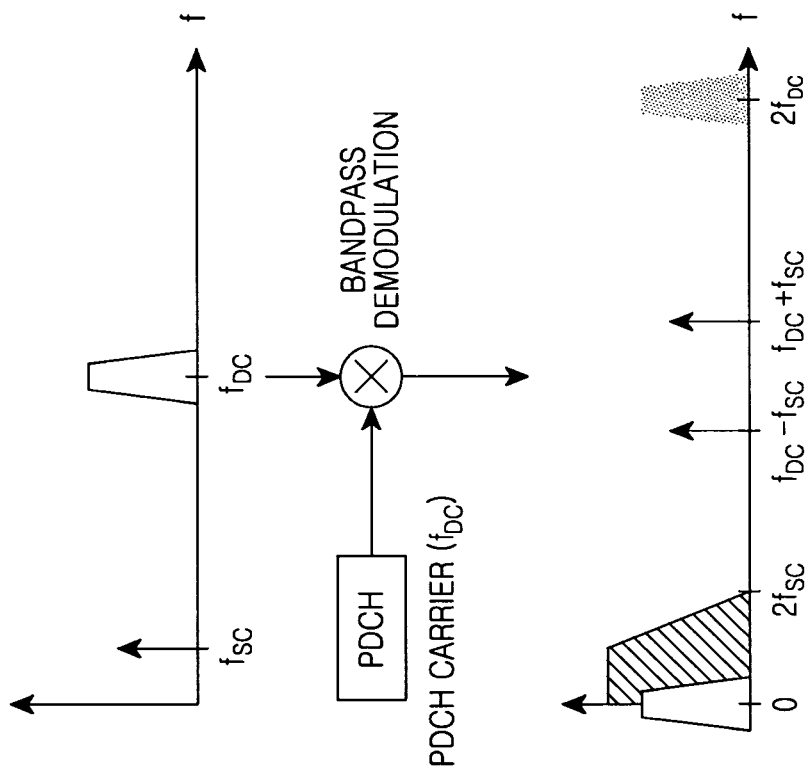
FIG. 6B illustrates a view of a frequency conversion process for a data channel.
Figure 6A:
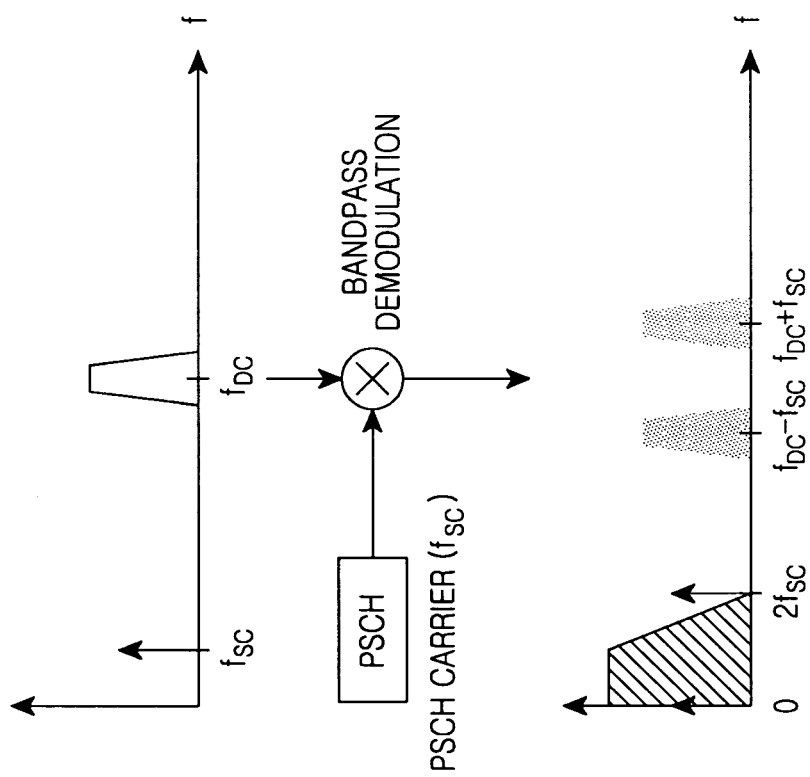
FIG. 6A illustrates a view of a frequency conversion process for a synchronous channel.

FIGS. 6A and 6B illustrates a view of a frequency conversion process of a receiver according to an exemplary embodiment of the present invention.

FIG. 6A illustrates a view of a frequency conversion process for a synchronous channel, and FIG. 6B is a view illustrating a frequency conversion process for a data channel.

Referring to FIGS. 6A and 6B, a signal $(f_c)_{LPF}$ that has passed through a Low Pass Filter (LPF) of the receiver is equal to or smaller than double of a carrier frequency of a synchronous channel $((f_c)_{LPF} \leq 2 \cdot f_{SC})$.

When the LPF meeting the above equation is used, the LPF may remove all high frequency signals generated by a difference between carrier frequencies of a PSCH and a PDCH.

As described above, exemplary embodiments of the present invention provide an apparatus and a method for improving data transmission performance of a human body communication system. The apparatus and the method generate and transmit a packet including information for discriminating between a synchronous channel and a data channel, and discriminate between the synchronous channel and the data channel when receiving a packet. Therefore, the apparatus and the method allow both a transmitter and a receiver to perform data transmission via a human body only when a human body contacts or closely contacts even under an environment where wireless transmission is possible in the conventional art, and realize high speed transmission via a human body by using a high frequency band. Accordingly, a close contact time or a contact time may be reduced. In addition, a receiver may be formed without an additional synchronization circuit for receiving data.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for transmitting and receiving data in a human body communication apparatus, the apparatus comprising:
    a transmitter configured to transmit signals through a human body by using a first transmission channel as a synchronous channel and using a second transmission channel as a data channel; and
    a receiver configured to determine a first carrier frequency of the synchronous channel when receiving a packet to perform a synchronization process via the synchronous channel, to perform the synchronization process through the synchronous channel if a strength of a first reception signal is greater than a first threshold for the synchronous channel, and, to determine a second carrier frequency of the data channel, and, to receive data through the data channel if a strength of a second reception signal is greater than a second threshold for the data channel,
    wherein the first carrier frequency of the first transmission channel is lower than a human body antenna frequency,
    wherein the second carrier frequency of the second transmission channel is higher than the human body antenna frequency, and
    wherein the human body antenna frequency is a frequency band where a human body antenna effect appears from.

2. The apparatus of claim 1, wherein the transmitter is further configured to generate a preamble, the preamble comprising synchronous channel information and data channel information.

3. The apparatus of claim 2, wherein the transmitter is further configured to generate and transmit a packet comprising the generated preamble.

4. The apparatus of claim 1, wherein the second threshold for the data channel is equal to or greater than the first threshold for the synchronous channel.

5. The apparatus of claim 1, wherein the second carrier frequency of the data channel is an integer-multiple of the first carrier frequency of the synchronous channel to determine whether the data synchronization is made.

6. A method for transmitting and receiving data in a human body communication apparatus, the method comprising:

transmitting, by a transmitter, signals through a human body by using a first transmission channel as a synchronous channel and using a second transmission channel as a data channel;

determining, by a receiver, a first carrier frequency of the synchronous channel when receiving a packet to perform a synchronization process via the synchronous channel;

if a strength of a first reception signal is greater than a first threshold for the synchronous channel, performing the synchronization process through the synchronous channel;

determining a second carrier frequency of the data channel; and if a strength of a second reception signal is greater than a second threshold for the data channel, receiving, by the receiver, data through the data channel, wherein the first carrier frequency of the first transmission channel is lower than a human body antenna frequency, wherein the second carrier frequency of the second transmission channel is higher than the human body antenna frequency, and wherein the human body antenna frequency is a frequency band where a human body antenna effect appears from.

7. The method of claim 6, further comprising:

generating, by the transmitter, a preamble comprising information of the synchronous channel and information of the data channel.

8. The method of claim 7, further comprising:

generating, by the transmitter, a packet comprising the generated preamble; and transmitted the generated packet.

9. The method of claim 6 wherein the second threshold for the data channel is equal to or greater than the first threshold for the synchronous channel.

10. The method of claim 6, wherein the second carrier frequency of the data channel is an integer-multiple of the first carrier frequency of the synchronous channel to determine whether the data synchronization is made.

11. A device capable of communicating via a human body communication apparatus, the device comprising:

a transmission controller configured to divide a transmission channel into a first transmission channel and a second transmission channel, wherein the transmission controller is configured to control to transmit signals through a human body by using the first transmission channel as a synchronous channel and the second transmission channel as a data channel;

a reception controller configured to determine a first carrier frequency of the synchronous channel when receiving a packet to perform a synchronization process via the synchronous channel, to perform the synchronization process through the synchronous channel if a strength of a first reception signal is greater than a first threshold for the synchronous channel, and, to determine a second carrier frequency of the data channel, and, to receive data through the data channel if a strength of a second reception signal is greater than a second threshold for the data channel, wherein the first carrier frequency of the first transmission channel is lower than a human body antenna frequency, wherein the second carrier frequency of the second transmission channel is higher than the human body antenna frequency, and wherein the human body antenna frequency is a frequency band where a human body antenna effect appears from.

12. The device of claim 11, wherein the first transmission channel comprising a frequency that is lower than an antenna frequency and the second transmission channel comprising a frequency that is higher than the antenna frequency.

13. The device of claim 11, wherein the transmission controller is configured to generate a preamble, the preamble comprising synchronous channel information and data channel information.

14. The device of claim 13, further comprising: a transmission data unit configured to generate data and a modulator configured to modulate the data.

15. The device of claim 11, further comprising: a transmission electrode adapted to couple to a human body.

16. The device of claim 11, wherein the second threshold for the data channel is equal to or greater than the first threshold for the synchronous channel.

17. The device of claim 11, wherein the second carrier frequency of the data channel is an integer-multiple of the first carrier frequency of the synchronous channel to determine whether the data synchronization is made.

\* \* \* \* \*